(12) United States Patent
Sugitani et al.

(10) Patent No.: US 6,634,454 B2
(45) Date of Patent: Oct. 21, 2003

(54) DRIVING APPARATUS FOR A VEHICLE

(75) Inventors: Nobuo Sugitani, Wako (JP); Osamu Tsurumiya, Wako (JP); Makoto Murata, Wako (JP); Masaaki Kawano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/995,509

(22) Filed: Nov. 27, 2001

(65) Prior Publication Data
US 2002/0063015 A1 May 30, 2002

(30) Foreign Application Priority Data

Nov. 28, 2000 (JP) ........................................ 2000-360743

(51) Int. Cl.⁷ ................................................ B62D 5/06
(52) U.S. Cl. ...................... 180/402; 180/444; 180/446; 180/333
(58) Field of Search ................................ 180/402, 403, 180/443, 444, 445, 446, 315, 333, 6.48; 701/41, 42

(56) References Cited

U.S. PATENT DOCUMENTS

| | | | | |
|---|---|---|---|---|
| 3,463,423 A | * | 8/1969 | Wong et al. ................ | 244/227 |
| 5,086,870 A | * | 2/1992 | Bolduc ........................ | 180/333 |
| 5,275,250 A | * | 1/1994 | Muller et al. ............... | 180/402 |
| 5,653,304 A | * | 8/1997 | Renfroe ...................... | 180/402 |
| 5,743,351 A | * | 4/1998 | McLaughlin ................ | 180/446 |
| 5,828,972 A | * | 10/1998 | Asanuma et al. ............ | 701/41 |
| 5,998,952 A | * | 12/1999 | McLaughlin et al. ....... | 318/432 |
| 6,032,757 A | * | 3/2000 | Kawaguchi et al. ........ | 180/446 |
| 6,148,939 A | * | 11/2000 | Brookhart et al. ......... | 180/6.48 |
| 6,186,265 B1 | * | 2/2001 | Boehringer et al. ........ | 180/402 |
| 6,213,248 B1 | * | 4/2001 | Kawaguchi et al. ........ | 180/446 |
| 6,474,436 B1 | * | 11/2002 | Konigorski ................. | 180/402 |

OTHER PUBLICATIONS

JP 09–301193 abstract. "Operating Element Arrangement Structure for Controlling Longitudinal Motion and Lateral Motion of Automobile". Nov. 25, 1997.

* cited by examiner

Primary Examiner—Lesley D. Morris
Assistant Examiner—Daniel Yeagley
(74) Attorney, Agent, or Firm—Merchant & Gould P.C.

(57) ABSTRACT

The object of the present invention is to provide a driving apparatus for a vehicle, which is capable of improving the operability and safety of a vehicle driving by enabling a fine correction to the steering amount with a simple apparatus. The apparatus employs the first and second operation devices, for which the steering gains are differentiated for the improvement.

8 Claims, 4 Drawing Sheets

DRIVING APPARATUS FOR A VEHICLE

FIELD OF THE INVENTION

The present invention relates to a steering apparatus which steers the steered wheels of a vehicle.

BACKGROUND OF THE INVENTION

A steering system employing a steering wheel as a driving apparatus, which steers the steered wheels of a vehicle, has been known. The steering system converts the rotational motion of a steering wheel into the linear motion of a rack axis in a steering gearbox, thus driving a link mechanism connected to the rack axis to steer the steered wheels.

In recent years another steering apparatus with joysticks instead of a steering wheel to steer the steered wheels of a vehicle has been proposed. This type of driving apparatus is disclosed in the patent gazette Japanese Laid-Open Patent 9-301193 as a prior example. This driving apparatus has at least two joysticks (control knobs) and performs the acceleration/deceleration or the turning of a vehicle with the operation of the joysticks in the direction of forward, backward, rightward or leftward. For example, a vehicle is accelerated when a forward operational force is added to the respective joysticks or it is decelerated when a backward operational force is added to them. And, the steered wheels are turned to the right when a rightward force is added to the respective joysticks or they are turned to the left when a leftward force is added to the respective joysticks. The respective joysticks are functionally equivalent and a driver can select and operate only one joystick or operate a plurality of joysticks simultaneously. When a plurality of joysticks ire simultaneously operated, provision for the operational contradiction among joysticks is made by prioritizing each joystick and accepting the operation with a joystick in the order of priority. This type of driving apparatus is more advantageous than the prior driving apparatus with a steering wheel because the layout flexibility and reliability are improved and die access from the right or left seat is selectable with a plurality of joysticks.

However, this type of driving apparatus has had difficulty in giving a small correction to the steering amount, which is one of basic performances required for steering. The steering wheel is able to rotate (operate) more than two revolutions; on the other hand the joystick is only able to operate within the tilt amount (tilt displacement) in the direction of forward/backward or right/left. So it is necessary to make the steering amount per unit operational amount (angle) of joystick bigger than the steering amount per unit operational angle of a steering wheel, however in doing so a fine correction of steering amount was difficult since the steered wheels made a large steering with a small operational amount. All the joysticks disclosed in the patent gazette Japanese Laid-Open Patent 9-301193 are of the same function, namely of the same characteristics. Therefore, it was difficult to give a fine correction to the steering amount, which had been realized by the steering wheel, since the operation was actually equivalent with one joystick operation even if selection or prioritization was made.

Further, the driving apparatus had problems that it required a complex control device for switching the respective joysticks or prioritizing them when a plurality of joysticks was in operation simultaneously, and confirmation by a driver of the switching operation or the operable joystick.

SUMMARY OF THE INVENTION

Therefore, the object of the present invention is to provide a driving apparatus, which enables the improvement of operational performance of a vehicle in driving, by allowing a fine correction of steering amount with a simple structure when a steering of steered wheels is performed with an operation device composed of joysticks etc.

The present invention to address the above issues provides a driving apparatus for a vehicle, which has an operation device operated by a driver, and in which an operation amount monitoring unit equipped in the operation device detects the operation amount of the operation device and a control device controls the steered wheels of a vehicle with the detected value, wherein the operation device comprises a first and a second operation devices, the control device comprises a steering amount setting unit which determines the steering amount for the steered wheels based on the resultant of the first detected operation amount resulting from the operation of the first operation device and the second detected operation amount resulting from the operation of the second operation device, and a first steering gain which is a ratio of the steering amount of steered wheels to the operation amount of the first operation device and a second steering gain which is a ratio of the steering amount of the steered wheels to the operation amount of the second operation device are differentiated.

The driving apparatus thus structured is capable of differentiating the steering amount per unit operation amount of the first and the second operation devices by setting the first and the second steering wheel gains different, as well as making the respective first and second operation devices contribute to the setting of the steering wheel amount. For example, in the case the gain of the second operation device is lower than that of the first operation device, it will be possible to utilize the second operation device as a fine adjustment means for the first operation device, since it can be set so that the steering amount per unit operation amount of the second operation device is less than that of the first operation device. Therefore, it will promote the operational performance of a vehicle as well as the improvement of the accuracy of steering wheel angle.

BRIEF DESCRIPTION OF THE DRAWINGS

FIG. 2($b$) is a perspective view showing the configuration of a second operation device. FIG. 2($c$) is a perspective view showing another configuration of a second operation device.

DESCRIPTION OF THE PREFERRED EMBODIMENTS

The preferred embodiment of the present invention will now be described in detail with reference to the accompanying drawings.

Figure 1:
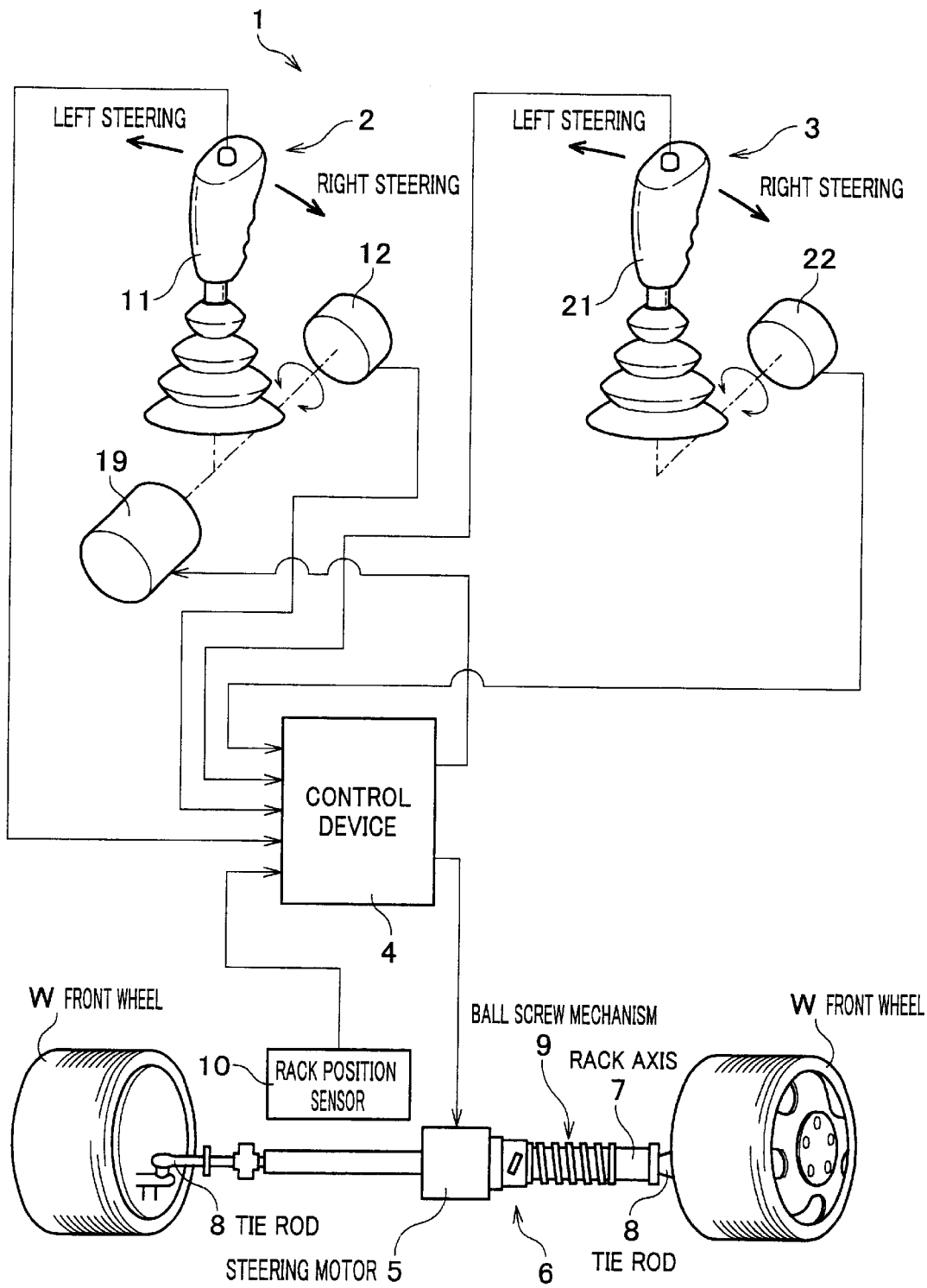
FIG. 1 is an overall view illustrating the structure of a driving apparatus according to the preferable embodiment of the present invention.

FIG. 1 is a structural view of the driving apparatus according to the embodiment of the present invention.

As shown in FIG. 1, a driving apparatus 1 enables CWB (Control By Wire) without a steering wheel, including a first operation device 2 and a second operation device 3. The operation amount of the first operation device 2 and the operation amount of the second operation device 3 are processed with the different gains in a control device 4, with the results of which a steering motor 5 is driven to steer wheels W, W.

Figure 2:
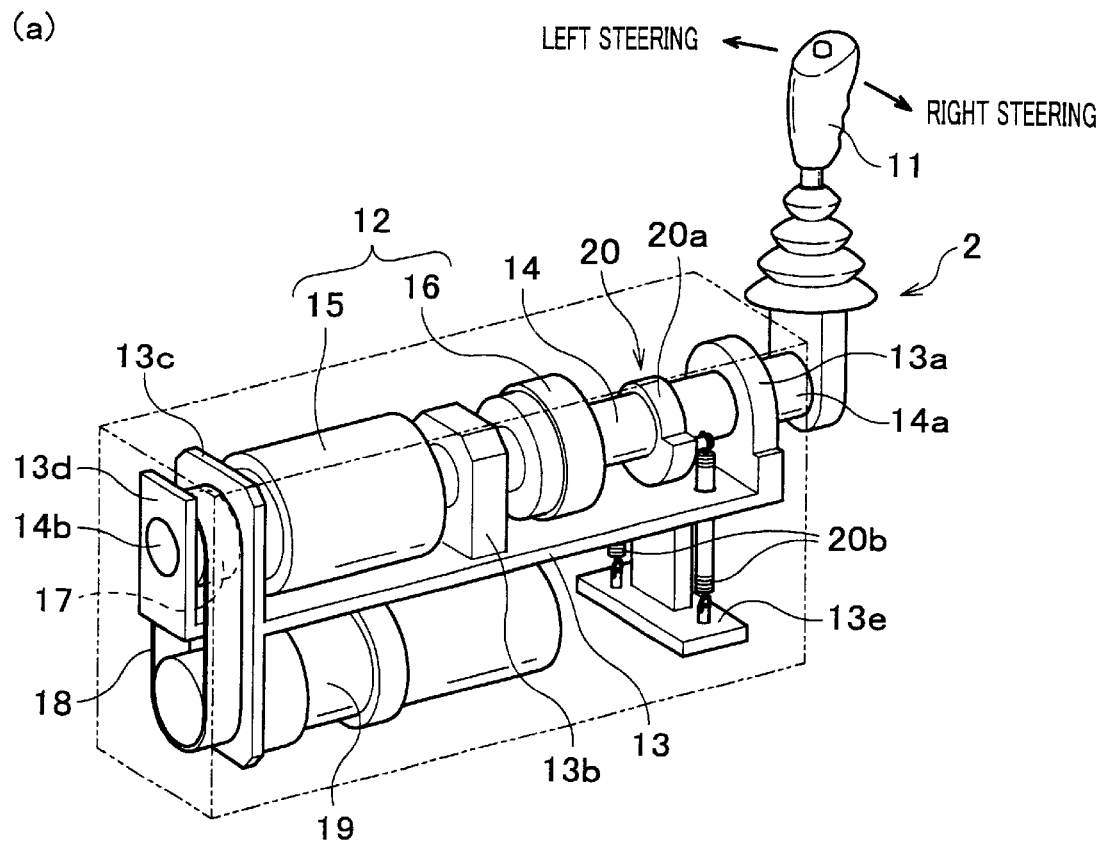
FIG. 2($a$) is a perspective view showing the configuration of a first operation device.
Figure 2:
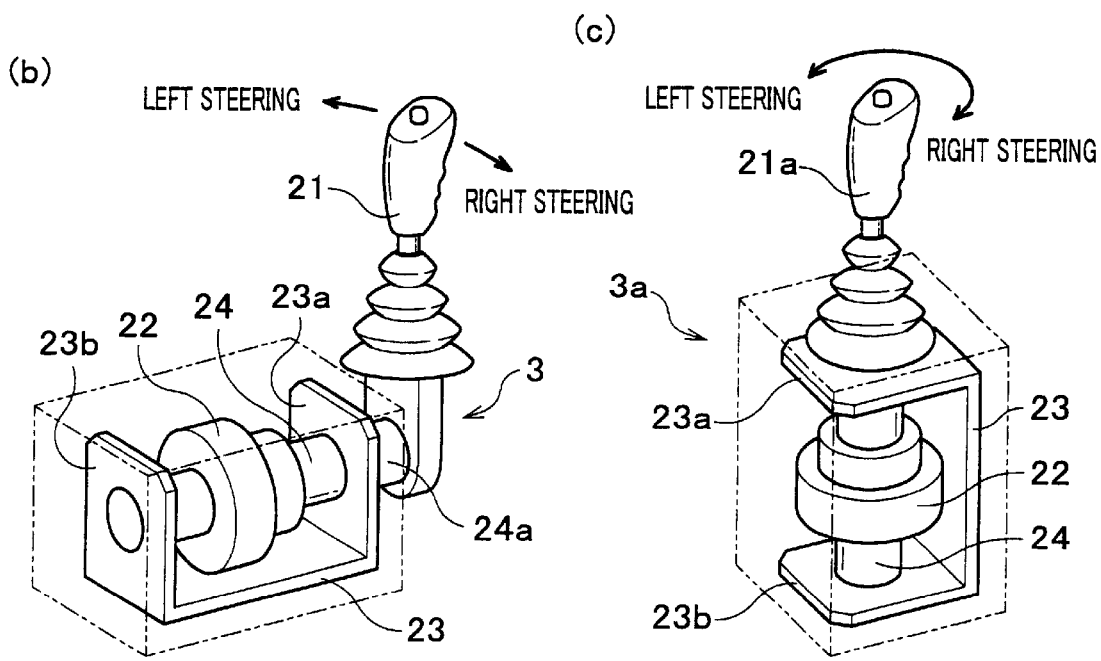

The steering of the steered wheels W, W is performed by converting the linear motion of a rack axis 7 of a steering gear 6 to the steering motion of the steered wheels W, W through tie rods 8, 8. The linear motion of the rack axis 7 is performed by the steering motor 5 and a ball screw mechanism 9 instead of a rack and pinion mechanism of the prior art. The position of the rack axis 7 during the linear motion is detected with a rack position sensor 10 and fed back to the control device 4. Such a publicly known sensor as a linear encoder or a potentiometer and the like is employed for the rack position sensor 10, and also a combination of plural sensors is possible. Numeral 12 referring to a first operation anoint detection unit, numeral 19 a steering reaction force motor and numeral 22 a second operation amount detection unit in FIG. 2 will be described in detail later.

The first operation device 2 will be described in detail.

As shown in FIG. 2(a), the first operation device 2 includes a first lever 11 operated by a driver, the first operation amount detection unit 12 for detecting the operation amount of the first lever 11 and a frame portion 13 for supporting the first operation amount detection unit 12.

A driver will operate the first lever 11 by gripping its top with his right or left hand. The end 14a of a rod 14 is fixed to the lower part of the first lever 11. The rod 14 is fixed perpendicular to the first lever 11 and supported with bearings and the like at wall portions 13a, 13b, 13c and 13d of the frame portion 13. It will allow such an operation that the first lever 11 can be tilted in a rotation-like motion in the right or left direction with the rod 14 as an axis. Hereinafter, the explanation will be made by referring to steering the steered wheels in the right direction by tilting the first lever 11 to the right with the rod 14 as an axis, as the right steering, on the other band steering the steered wheels in the left direction by tilting the first lever 11 to the left with the rod 14 as an axis, as the left steering.

A steering torque sensor 15 and a steering amount sensor 16, which are included in the first operation amount detection unit 12, are disposed in the longitudinal direction of the rod 14.

Figure 3:
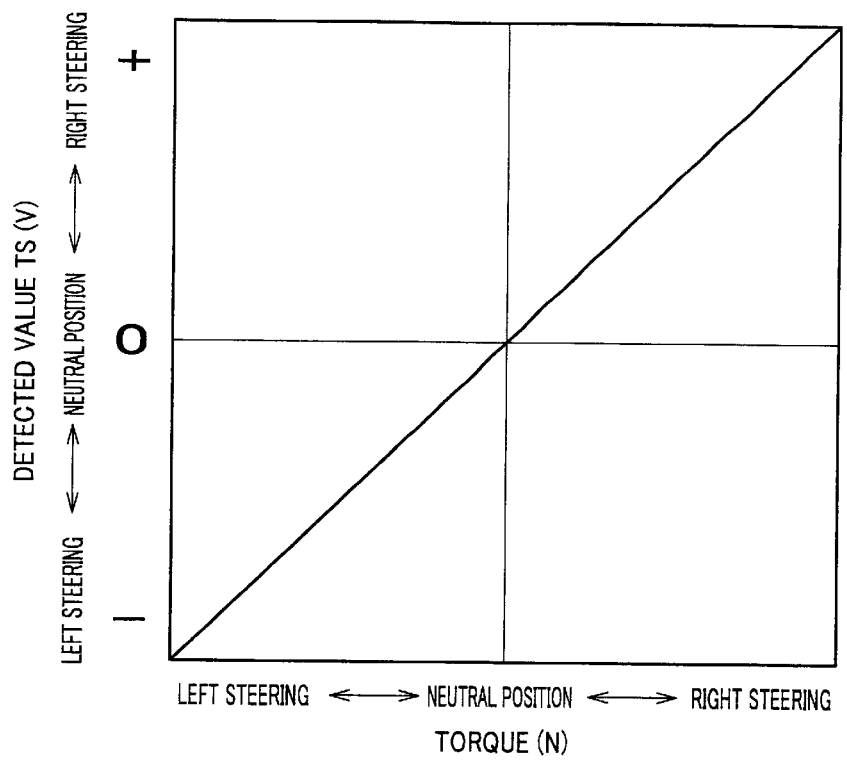
FIG. 3 is a graph showing the output characteristics of a steering torque sensor.

The steering torque sensor 15, which is composed of a publicly known sensor using a strain gauge and the like, will improve the response by detecting the torque added to the first lever 11 when the operation is started or the direction of the steered wheels W, W is changed. The characteristics of the output of the steering torque sensor 15 are shown in FIG. 3. When the first lever 11 is in the neutral position, the steering torque sensor 15 will give no output, but when the first lever is tilted for the right steering, the steering torque sensor 15 will give a positive detected value TS and the detected value TS will increase with the increase of the torque added to the first lever 11. On the other hand, when the first lever is tilted for the left steering from the neutral position, the detected value TS will be negative, and it will decrease with the increase of the torque added to the first lever 11. The detected value TS of the steering torque sensor 15 is sent to the control device 4 through a harness (signal transmission cable), and used for FF (Feed-Forward) control to be described later.

Figure 4:
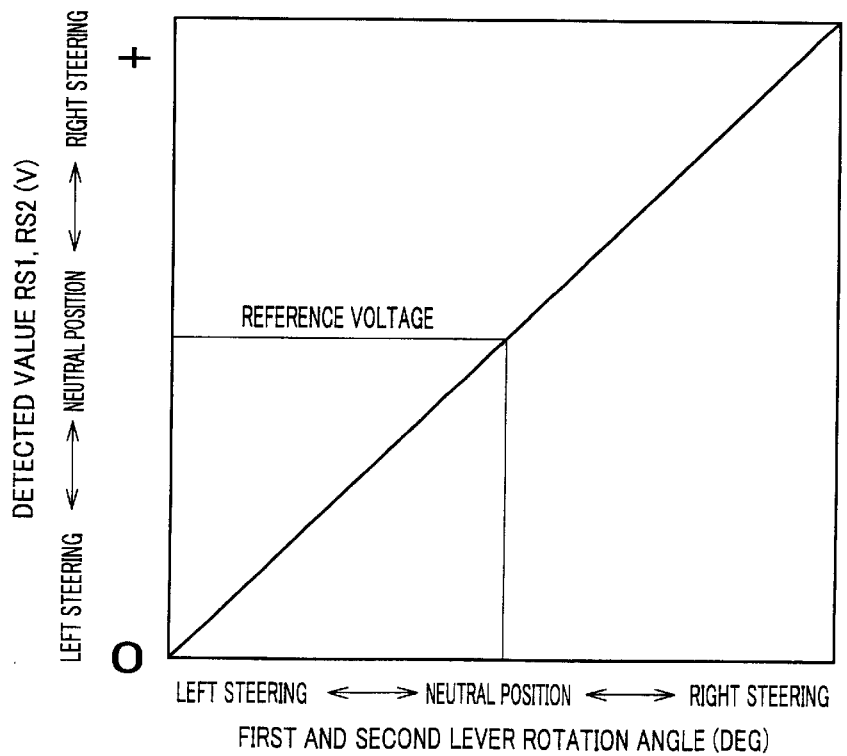
FIG. 4 is a graph showing the output characteristics of a steering amount sensor of the first and second operation devices.

The steering amount sensor 16 includes a potentiometer for detecting the rotation angle of the rod 14 resulting from the operation of the first lever 11. The steering amount sensor 16 gives the operation amount of the first lever 11 as an output of voltage detected value RS1). As shown in FIG. 4, a reference voltage is given when the first lever 11 is in the neutral position, and when the right steering is performed, the detected value RS1 will increase according to the rotation amount of the first lever 11, on the other hand when the left steering is performed, the detected value RS1 will decrease according to the rotation amount of the first lever 11. The detected value RS1 of the steering amount sensor 16 is sent to the control device 4 through the harness, with which the control device 4 determines the steering amount of the steered wheels W, W as a principle value.

The other end 14b of the rod 14 has a pulley 17, which is connected to the rotation axis of a steering reaction force motor 19 with a belt 18.

The steering reaction force motor 19 generates a reaction force (steering reaction force) of the reverse direction and amount, according to the position and the direction of the first lever 11 with the reception of the signal from the control device 4, thus improving the operational performance and the steering accuracy. For example, in the case the first lever 11 is further tilted to the tight while the right steering is being carried out, the steering reaction force motor 19 will generate the steering reaction force in the reverse direction of the right steering. The bigger the operation amount the first lever 11 is, the bigger steering reaction force the steering reaction force motor 19 will generate, enabling a driver to feel the current steering angle and his operation amount with the magnitude of the reaction force. On the other band, when the first lever 11 is operated to tilt back to the neutral position from the right steering, a driver can smoothly tilt back the first lever 11 to the neutral position, since the steering reaction force motor 19 does not generate the steering reaction force. Therefore, a driver can perform an optimum steering, since he can easily recognize the current steering status. When the first lever 11 is operated to tilt back to the neutral position, the steering reaction force motor 19 may be instead adjusted so that it assists the return of the first lever 11.

There is provided also a centering mechanism 20, which assists the first lever 11 to go back to the neutral position, between the first lever 11 and the steering amount sensor 16. The centering mechanism 20 includes a plate 20a fixed to the rod 14 and centering springs 20b, 20b, the hooks of which are fixed on both edges of the plate 20a, and the lower hooks of the centering springs 20b, 20b fixed to a bottom 13e of the frame portion 13. Therefore, when a left steering is, for example, performed, the centering spring 20b expands, which is located in the front in FIG. 2(a), assisting the first lever 11 to return to the neutral position with the reaction force created by contracting back to its original length. When the first lever 11 is tilted back to the neutral position, the reaction force of the centering spring 20b will assist the first lever 11 to return.

The second operation device 3 will be described in detail with reference to FIG. 2(b).

The second operation device 3 is provided for giving a fine adjustment to the steering by the first operation device 2, including a second lever 21 operated by a driver, a second steering amount sensor 22 for detecting the operation amount of the second lever 21 and a frame portion 23 for supporting the second steering amount sensor 22.

The second lever 21 is gripped by the right or left hand, which is another hand different from the hand for the first level 11. Under the second lever 21 is fixed an end portion 24a of a rod 24. The rod 24 is fixed perpendicular to the second lever 21 and supported with bearings and the like at wall portions 23a and 23b of a frame portion 23. It will allow such an operation that the second lever 21 can be tilted in a rotation-like motion in the right or left direction with the rod 24 as an axis, Hereinafter, the explanation will be made by referring to steering the steered wheels in the right direction by tilting the second lever 21 to the right with the rod 24 as an axis, as the right steering, on the other hand steering the steered wheels in the left direction by tilting the second lever 21 to the left with the rod 24 as an axis, as the left steering.

The second steering amount sensor 22 is composed the same as the first steering amount sensor 16. It gives a reference voltage when the second lever 21 is in the neutral position as shown in FIG. 4, and a detected value RS2 will increase when the second lever 21 is tilted further for the right steering, on the other hand the detected value RS2 will decrease when the left steering is made. The detected value RS2 is sent to the control device 4 through the harness and used for the fine adjustment of steering amount.

As shown in FIG. 2(c), it is possible to select an operation device 3a, in which a second lever 21a is aligned with the rod 24 so that the steering amount may be controlled with the rotation of the second lever 21a. In this case, the right steering is made by rotating the second lever 21a to the right and the left steering by rotating the second lever 21a to the left.

A motor similar to the steering reaction force motor 19 may be prepared for the second operation device 3 to give an approximately same operation feeling to the right and left levers 11 and 21, however it would be preferable to dispense with this type of motor for the second operation device 3 in order to give a clear recognition to a driver about the roles of the first and second devices 2 and 3.

In this connection, the first and second operation devices 2 and 3 may be respectively placed at the right and left of a driver's seat or two of them may be placed in front of a driver's seat.

The control device 4 will be described in detail.

Figure 5:
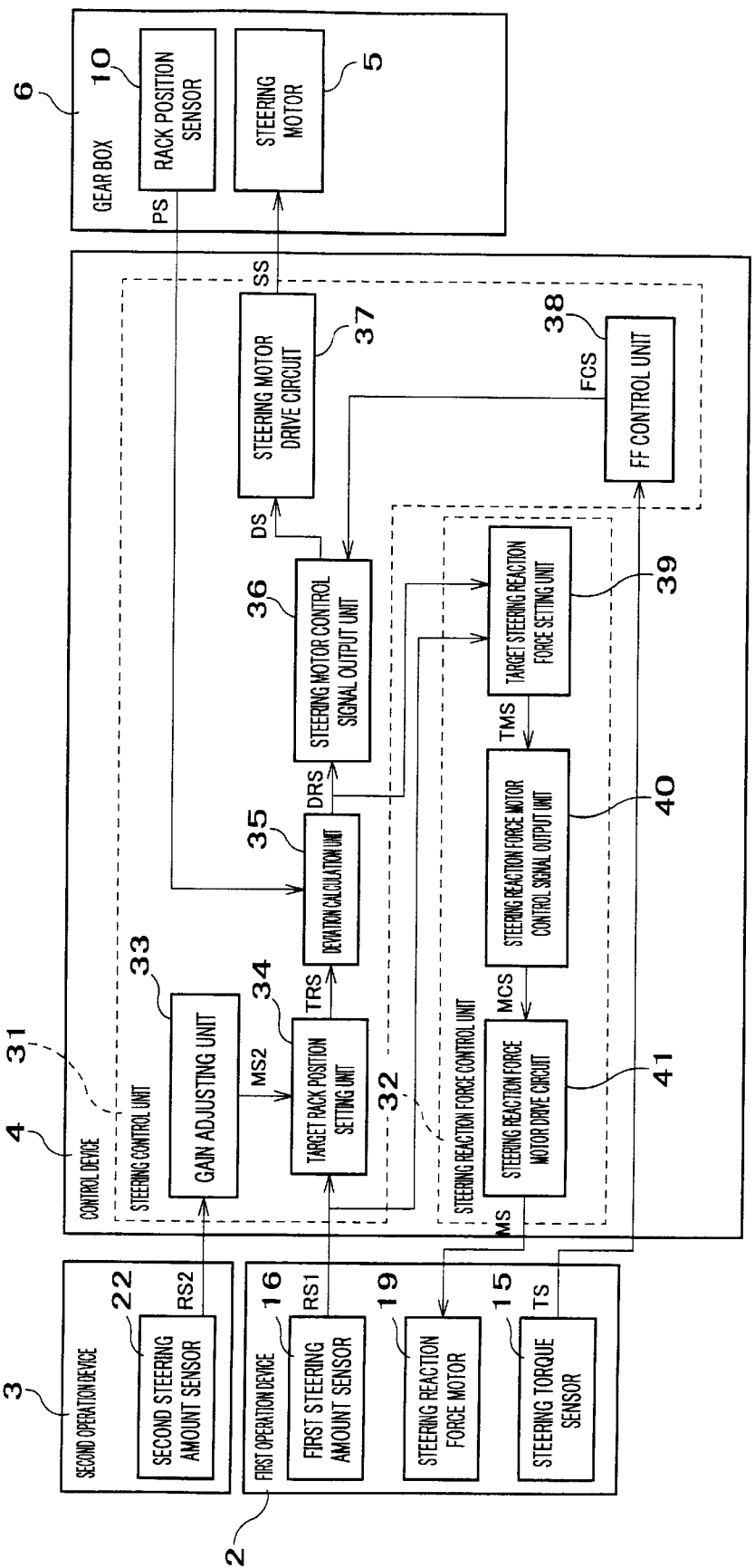
FIG. 5 is a block diagram showing the data processing performed in a driving apparatus for a vehicle.

As shown in FIG. 5, the control device 4 includes, CPU (Central Processing Unit), ROM (Read Only Memory), RAM (Random Access Memory) and ECU (Electronic Control Unit 4), electrically connected to the first operation device 2, the second operation device 3 and the gear box 6 through the harness of signal transmission cable.

The control device 4 includes, the second steering amount sensor 22 of the second operation device 3, the first steering amount sensor 16 of the first operation device 2, a steering control unit 31 which drives the steering motor 5 of the gearbox 6 receiving the detected values of the first steering amount sensor 16 of the first operation device 2 and the steering torque sensor 15, and a steering reaction force control unit 32 which controls the steering reaction force motor 19 of the first operation device 2.

A steering control unit 31 includes, a gain adjusting unit 33, a target rack position setting unit 34, a deviation calculation unit 35, a steering motor control signal output unit 36 and a steering motor drive circuit 37. The gain adjusting unit 33 sends an output signal MS2, which is a gain reduced signal of the detected value RS2 received from the second steering amount sensor 22 of the second operation device 3. The target rack position setting unit 34 determines the target value for the position of the rack axis 7 according to the driver's operation amount, taking into account the output signal MS2 and the detected value RS1 of the first steering amount sensor 16 of the first operation device 2. The deviation calculation unit 35 calculates the deviation based on the target of rack position and the current rack position. The steering motor control signal output unit 36 generates an output signal DS (direction signal+PMW signal) which drives the steering motor 5 according to the deviation. The steering motor drive circuit 37 drives the steering motor 5 based on the output signal DS. The target rack position setting unit 34 and the deviation calculation unit 35 refer to a steering amount setting unit according to the appended claim.

The gain adjusting unit 33 sets the steering amount per the unit operation angle of the second operation device 3 less than that of the first operation device 2. It does so by reducing the gain of the detected value RS2 (the second steering gain), which is the operation amount of the second operation device 3, compared with the gain of the detected value RS1 (the first steering gain) of the first operation device 2. Therefore, the control device 4 sets the operation amount of the first operation device 2 as a principle value and performs an addition or subtraction of the small output signal MS2 resulting from the operation amount of the second operation device 3 as a compensational value, thus determining a target rack position TRS, namely a steering amount. Therefore, a driver can perform a relatively large steering with the first operation device 2 and a fine adjustment with the second operation device 3, resulting in an accurate and stable steering.

The gain set for the gain adjusting unit 33 will be determined for each type of vehicle. It is possible to prepare a map, which defines the variation of the gain with the speed and steering amount of a vehicle, and make the gain vary in accordance with the map.

The target rack position setting unit 34 composes the detected value RS1 and the output signal MS2 after their level adjustment, and determines the target rack position by carrying out a map retrieval with the resultant value as an address. The level adjustment is a process that the respective voltages of the detected value RS1 and the output signal MS2 are converted so that they have a positive voltage in the case of the right steering and a negative voltage in the case of the left steering, having them biased to define the respective neutral positions of the first operation device 2 and the second operation device 3 as zero point. With this type of process, for example, when the first operation device 2 is in the right steering condition and the second operation device 3 is in the right steering condition, the resultant value will increase. Subsequently, if the first operation device 2 holds the right steering condition and the second operation device 3 is changed to the left steering condition, the resultant value will decrease to reliably track the variation of the steering amount, thus enabling a constant setting of correct target rack position.

The deviation calculation unit 35 calculates the deviation between the target rack position signal TRS and the current rack position signal PS measured by the rack position sensor 10. It determines the steering direction is rightward if the deviation is positive, or leftward if it is negative, thereby giving a deviation signal DRS with an appropriate polarity and magnitude for each case.

The steering motor control signal output unit 36 performs P (Proportional), I (Integral) and D (Differential) processing for the deviation signal DRS to generate a control signal CS and compose it with a control signal FCS to be described later. Further, it sends the output signal DS (direction signal+PWM signal) which is representative of the polarity and magnitude of the resultant value, to a steering motor drive circuit 37. The steering motor control signal output unit 36 improves the tracking performance for the movement of the rack axis 7 relative to the target rack position with the PID function mentioned before.

The steering control unit 31 has an FF control unit 38, which gives the control signal FCS to the steering motor control signal output unit 36 based on the detected value TS of the steering torque sensor 15 of the first operation device 2 to perform an FF control, thus improving the initial steering response. So, in such a case as an initial operation that the operation amount of the first lever 11 is not large but the torque added to it is large, it is possible to improve the steering response, since the rack axis 7 can be moved in advance of the subsequent increase in the operation amount of first lever 11. The control signal FCS is determined with the map of the detected torque value TS and the drive amount of the steering motor 5 in the FF control unit 38.

The steering reaction force control unit 32 includes a target steering reaction force setting unit 39, a steering reaction force motor control signal output unit 40 and a steering reaction force motor drive circuit 41. The target steering reaction force setting unit 39 determines the target reaction force to be added to the first lever 11 based on the detected value RS1 of the first steering amount sensor 16 of the first operation device 2 and the deviation signal DRS of the deviation calculation unit 35. The steering reaction force motor control signal output unit 40 collects the target reaction force signal TMS sent from the target steering reaction force setting unit 39 and gives a control signal MCS to drive the steering reaction force motor 19. The steering reaction force motor drive circuit 41 is composed of an electrical circuit for driving the steering reaction force motor 19 based on the control signal MCS.

The target steering reaction force setting unit 39 decides in which direction of the right or left the first lever 11 is currently positioned relative to the neutral position based on the detected value RS1 of the first steering amount sensor 16, and also makes a decision on the direction and amount of steering based on the deviation signal DRS, thereby determining the direction and amount of the steering reaction force to be generated by the steering reaction force motor 19.

Steering of the vehicle, on which the drive control device 4 is mounted, will be described in detail.

When a driver operates the first lever 11 rightward from the neutral position for steering, the torque added to the first lever 11 will be large at the initial stage of operation, though the operation amount of the first lever 11 is small. The FF control unit 38 of the steering control unit 31 determines the control signal FCS for the steering motor control signal output unit 36 retrieving the torque map with the detected torque value TS as an address, for the steering torque sensor 15 gives a detected torque value TS (positive output). The rack axis 7 starts the linear motion and moving leftward according to the control signal FCS in advance of the subsequent main operation of the first lever 11.

The control device 4 sets the target rack position based on the operation amount of the first lever 11 and calculates the deviation between the target rack position and the current rack position. The steering motor 5 drives the rack axis leftward according to the deviation. On the other hand, the steering reaction force control unit 32 determines the steering reaction force to be added to the first lever 11 and drives the steering reaction force motor 19, giving the leftward steering reaction force to the first lever 11.

If the first lever 11 is operated rightward further, the steering amount will increase rightward, as well as the increase of the leftward steering reaction force. On the other hand, if the first lever 11 is operated leftward, the steering reaction force will disappear as well as the decrease of the steering amount.

When the second lever 21 is operated rightward, in the same direction of the first lever 11, while the first lever 11 is being operated rightward, the steering amount will increase rightward, since the target rack position increases by the output signal MS2, which is created by reducing the gain of the detected value RS2 of the operation amount of the second lever 21. On the other hand, when the second lever 21 is operated leftward, the steered wheels W, W will accordingly return toward the neutral position, since the target rack position will decrease by the output signal MS2, which is created by reducing the gain of the detected value RS2.

Next explanation is about the case that a driver operates the first lever 11 leftward starting from the neutral position.

The FF control unit 38 of the steering control unit 31 determines the control signal FCS for the steering motor control signal output unit 36 by retrieving the torque map with the torque output TS as an address, for the steering torque sensor 15 of the first operation device 2 gives the output TS (negative value in this case) at the initial stage of operation like the rightward operation. The rack axis 7 starts the linear motion and moving rightward based on the control signal FCS in advance of the subsequent main operation of the first lever 11.

The control device 4 sets the target rack position based on the operation amount of the first lever 11 and calculates the deviation of the current rack position PS relative to the target rack position. The steering motor 5 operates according to the deviation and moves the rack axis 7 rightward. On the other hand, the steering reaction force control unit 32 of the control device 4 determines the steering reaction force to be added to the first lever 11 and drives the steering reaction force motor 19, giving the rightward steering reaction force to the first lever 11.

If the first lever 11 is operated leftward further, the steering amount will increase leftward, as well as the increase of the rightward steering reaction force. On the other hand, if the first lever 11 is operated rightward, the steering reaction force will disappear as well as the decrease of the steering amount.

When the second lever 21 is operated leftward, in the same direction of the first lever 11, while the first lever 11 is being operated leftward, the steering amount will increase leftward, since the target rack position decreases by the output signal MS2, which is created by reducing the gain of the detected value RS2 of the operation amount of the second lever 21. On the other hand, when the second lever 21 is operated rightward, the steered wheels W, W will accordingly return toward the neutral position, since the target rack position will increase by the output signal MS2, which is created by reducing the gain of the detected value RS2.

Steering as described before, in which the combination of the first and second levers 11 and 21 is utilized and the second lever 21 is used as a fine adjustment means for the first lever 11 by setting the gain of the second lever 21 less than that of the first lever 11, will improve the operability and steering accuracy.

It will now be appreciated from the foregoing description that the present invention is not limited to the particular illustrated embodiment discussed above and may be carried out in various modified forms. For example, as the method of differentiating the first and second steering gains, the different gains may be defined for the detected value RS1 of the first steering amount sensor 16 resulting from the operation amount of the first lever 11 and the detected value RS2 of the second steering amount sensor 22 resulting from the operation amount of the first lever 21. And the FF control with the steering torque is not necessarily required.

What is claimed is:

1. A steering apparatus for a vehicle with steered wheels to be steered, comprising:

first and second operation devices which are operated by an operator so as to steer the vehicle, said first and second operation devices having first and second gains and outputting different first and second detected values, respectively, wherein said first detected value determines primary steering and said second detected value is used to provide fine adjustment, said first gain being a first ratio of steering amount of the steered wheels to operation amount of said first operation device and said second gain being a second ratio of steering amount of the steered wheels to operation amount of said second operation device;

a control device which receives said first and second detected values and determines a steering amount output signal; and a steering motor driving the steered wheels based on said steering amount output signal of said control device.

2. The steering apparatus of claim 1 wherein said control device includes a gain adjusting unit which reduces said second gain to adjust said second detected value and output a compensational output signal, said control device further including a steering amount setting unit which receives at least said compensational output signal resulting from the operation of said second operation device and said first detected value resulting from the operation of said first operation device to provide a deviation signal from which the steering amount output signal is developed.

3. The steering apparatus of claim 1 including a rack and a rack sensor along said rack, said rack sensor detecting rack position and outputting a signal to said control device.

4. The steering apparatus of claim 1 wherein said first operation device includes a torque sensing device, said torque sensing device outputting a signal to said control device, said torque sensing device being a strain gauge.

5. The steering apparatus of claim 2 wherein said gain adjusting unit includes a map which defines variation of gain with speed and steering amount of said vehicle, said first and second gains being adjusted in accordance with said map.

6. The steering apparatus of claim 1 including a steering torque sensor for said first operation device and wherein said control device includes a feedforward control unit, which performs feedforward steering control based on a detected value of said steering torque sensor thereby improving initial steering response.

7. The steering apparatus of claim 1, wherein said first gain is larger than said second gain so that said first operation device serves as a primary steering device and said second operation device serves as a supplementary steering device for fine steering.

8. The steering apparatus claim 7, including a steering reaction force motor connected only to said primary steering device and nor to said supplementary steering device so that a driver can distinguish said primary steering device from said supplementary steering device.

* * * * *